Figure 1:
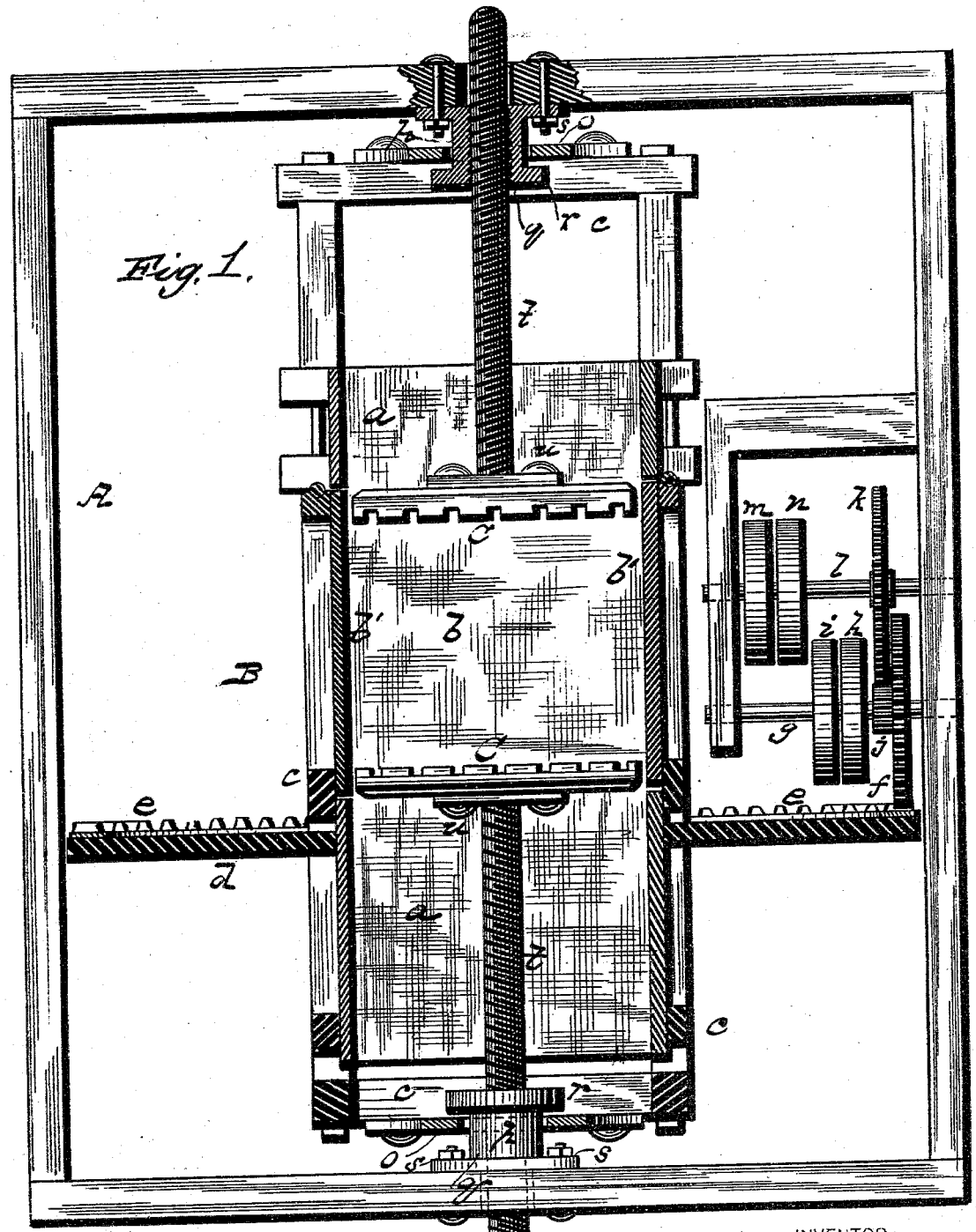

(No Model.) 2 Sheets—Sheet 1.

E. U. G. REAGAN.
BALING PRESS.

No. 295,282. Patented Mar. 18, 1884.

WITNESSES
C. M. Bates.
W. E. Shiebler.

INVENTOR
E. U. G. Reagan
By Wm. H. Bates & Co
his ATTORNEYS.

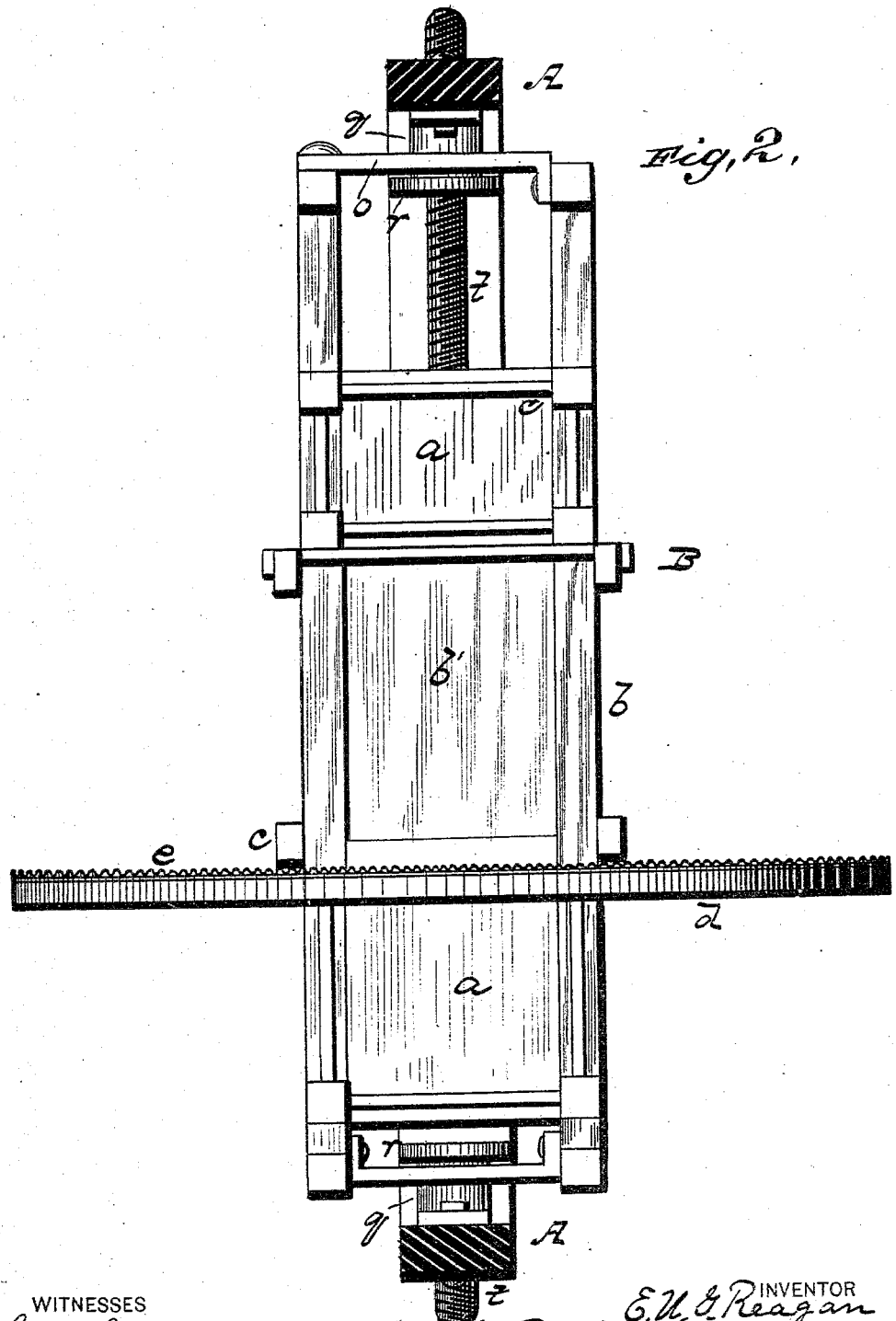

UNITED STATES PATENT OFFICE.

EDGAR U. G. REAGAN, OF LA GRANGE, TEXAS, ASSIGNOR OF ONE-HALF TO AUGUST WARNKEN, OF SAME PLACE.

BALING-PRESS.

SPECIFICATION forming part of Letters Patent No. 295,282, dated March 18, 1884.

Application filed January 10, 1884. (No model.)

*To all whom it may concern:*

Be it known that I, EDGAR U. G. REAGAN, a citizen of the United States, residing at La Grange, in the county of Fayette and State of Texas, have invented certain new and useful Improvements in Baling-Presses, of which the following is a specification, reference being had therein to the accompanying drawings.

This invention has relation to improvements in baling-presses; and it consists in the construction and novel arrangement of the same, all as will be hereinafter more fully explained, and particularly pointed out in the claim appended.

The annexed drawings, to which reference is made, fully illustrate my invention, in which Figure 1 represents a vertical sectional view of my device, and Fig. 2 is a side view of the same.

Referring to the accompanying drawings, letter A designates the frame of the machine, and B the baling-press, which consists of upper and lower fixed portions, $a$ $a$, and a central portion, $b$, having doors $b'$ $b'$, the whole suitably braced by longitudinal and cross bars $c$, as shown in the drawings. Below the center of the box or portion $b$, and rigidly secured to the press, is a circular platform, $d$, having on its upper face a gear-wheel, $e$, that engages a gear-wheel, $f$, secured to a shaft, $g$, on which is fixed a pulley, $h$, and a loose pulley, $i$, and secured to said shaft is a pinion, $j$, which meshes with a cog-wheel, $k$, secured to a shaft, $l$, on which is also fixed a pulley, $m$, and a loose pulley, $n$. At the ends of the press are provided plates $o$ $o$, which are centrally perforated to receive the circular body portion $p$ of the nuts $q$ $q$, which latter are provided with heads or collars $r$ $r$, and said nuts are rigidly secured to the frame A, as at $s$ $s$, whereby said nuts are prevented from turning.

C C indicate two follower-blocks having long screws $t$ $t$, the inner ends or bases of which are secured to the backs of the followers C C, as shown at $u$ $u$. One of these screws is a right-hand screw and the other is a left-hand screw, and when the press is filled with material—such as cotton, hay, and the like—and the doors $b'$ $b'$ are secured, the cog-wheel $k$ is put in motion through the medium of a belt attached to the pulley $m$ on said shaft $l$, that may be connected with an engine or other motor. This cog-wheel $k$ communicates motion to the pinion $j$, thus revolving the wheel $f$, thereby causing the platform to revolve, carrying therewith the entire press, thus producing movement to the followers, and by the right-hand and left-hand screws, working in the nuts $q$ $q$, causing the followers to approach one another, and consequently press between them the material in the press, when the same or bale can be taken out through the doors $b'$ $b'$, after pressure by the followers is removed, and the bale is suitably tied.

It will thus be seen from the above description, and by reference to the annexed drawings, that when the press and followers are revolving the plates also revolve around the nuts $q$ $q$, the latter remaining in a fixed position, and after the material is packed or baled and removed through the doors $b'$ $b'$, leaving the press for another operation, the followers, as well as the press, are given a reverse movement, which is designed to be very rapid, in order to quickly separate the follower-blocks, carrying them to each end of the machine or press. This rapid movement is accomplished by the following means: The belt on the pulley $m$, which has been used for baling, is shifted to the loose pulley $n$, thus throwing it out of connection with the gearing, and the belt which has been on the loose pulley $i$ is shifted upon the fixed pulley $h$, thus revolving the cog-wheel $f$, which, meshing with the gear-wheel $e$ on the platform $d$, causes a quick revolution to the press and follower-blocks, rapidly separating the latter and causing each block to withdraw to each end of said press, and when the latter is again filled with material the belts are again shifted to their former positions for baling, as hereinbefore mentioned.

If desirable, a lever, one end of which may be fixed to the platform and the opposite free end provided with a single-tree for attachment of horse-power for revolving the press, may be used.

Having thus described my invention, what I claim, and desire to secure by Letters Patent, is—

The combination, in a baling-press, of the press B, provided with the circular platform $d$, having the gear-wheel $e$, the centrally-perforated plates *o o*, right-hand and left-hand screws *t t*, secured to the follower-blocks C C, nuts *q q*, cog-wheel *f*, pinion *j*, pulleys *h i* on the shaft *g*, gear-wheel *k*, and pulleys *m n* on the shaft *l*, the whole constructed and arranged to operate in conjunction with one another, as herein shown and described.

In testimony whereof I affix my signature in presence of two witnesses.

EDGAR U. G. REAGAN.

Witnesses:
ELDON BURNS,
JOHN B. HALLOWAY.